Aug. 30, 1955     H. R. HASTINGS     2,716,685

VARIABLE RESISTOR FOR LIQUID LEVEL TELEMETRIC SYSTEM

Filed Jan. 16, 1953     2 Sheets-Sheet 1

INVENTOR
*Homer R. Hastings*
BY
*Willits, Helmig & Baillie*
ATTORNEYS

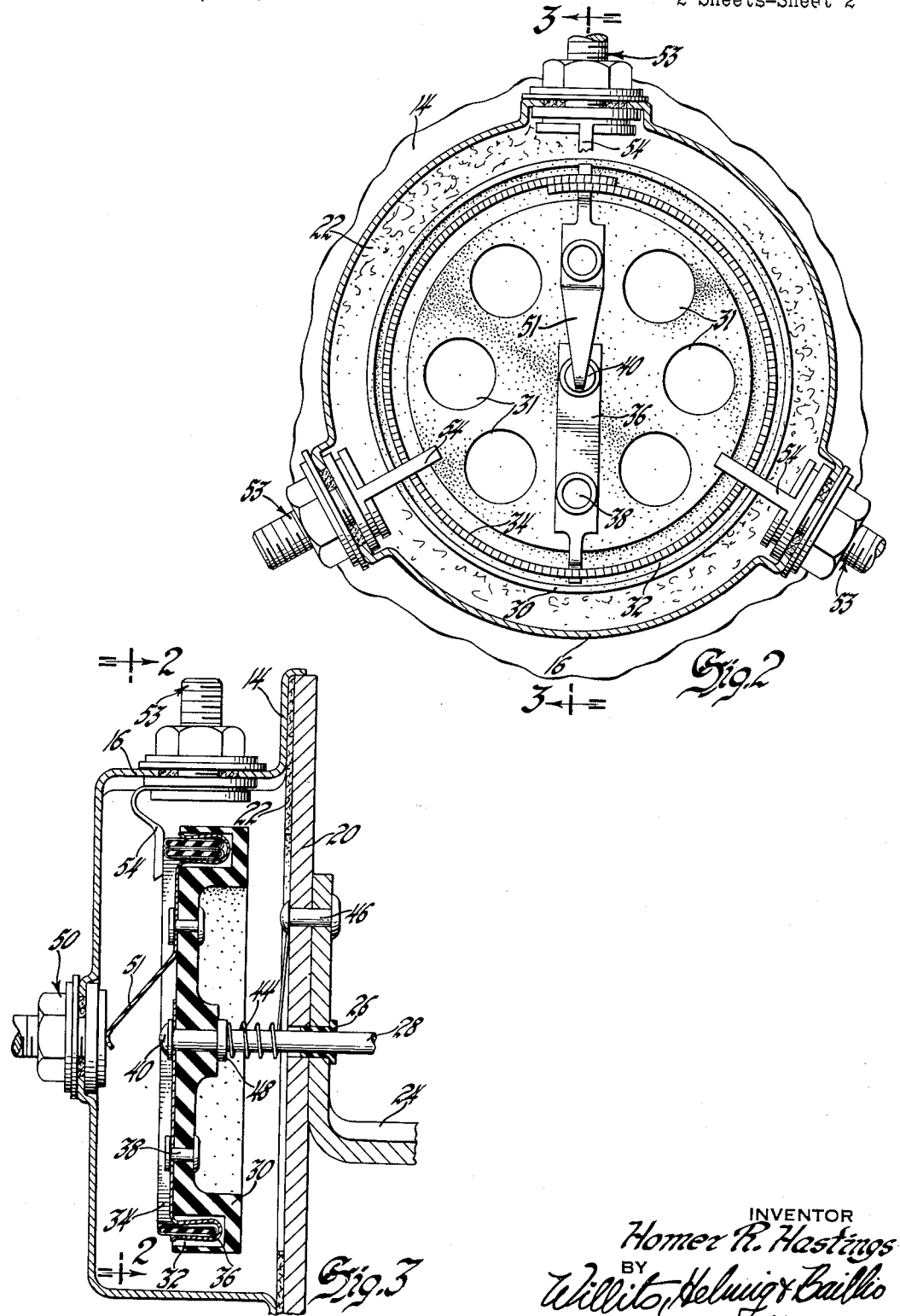

2,716,685
Patented Aug. 30, 1955

2,716,685

VARIABLE RESISTOR FOR LIQUID LEVEL TELEMETRIC SYSTEM

Homer R. Hastings, Flint, Mich., assignor to General Motors Corporation, Detroit, Mich., a corporation of Delaware Application January 16, 1953, Serial No. 331,687

7 Claims. (Cl. 201—48)

This invention relates to electric telemetric liquid level gauges and has particular reference to sending units installed in tanks containing liquids, the levels of which are to be determined or indicated. Although the present unit is intended for use in the fuel tank of an automotive vehicle, its use is obviously not limited thereto.

Sending units have been employed with telemetric liquid level gauges heretofore but several difficulties have been encountered. Some units employ resistance elements constituted of coils of wire about strips of paper or the like and the process of manufacture of the sending unit is slow because of the difficulty in picking leads out from the coils. Another difficulty with sending units heretofore known is the considerable frictional resistance which must be overcome during operation. The difficulty of manufacture and the degree of frictional resistance both tended to increase the possibility of producing units which were not as reliable in operation as would be desirable.

An object of the present invention is to produce an improved sending unit of simplified manufacture which involves a minimum of friction in operation and is reliable in performance.

To this end one feature of the present invention resides in an annular resistance element which is adapted to rotate in response to a change in liquid level in a tank, this rotary element permitting the employ of stationary or fixed contacts which have leads easily connected to an indicating instrument of a telemetric system.

In the drawings:

Figure 2 is an enlarged sectional view through the sending unit of Figure 1; and Figure 3 is a sectional view taken along the line 3—3 of Figure 2.

Figure 1:
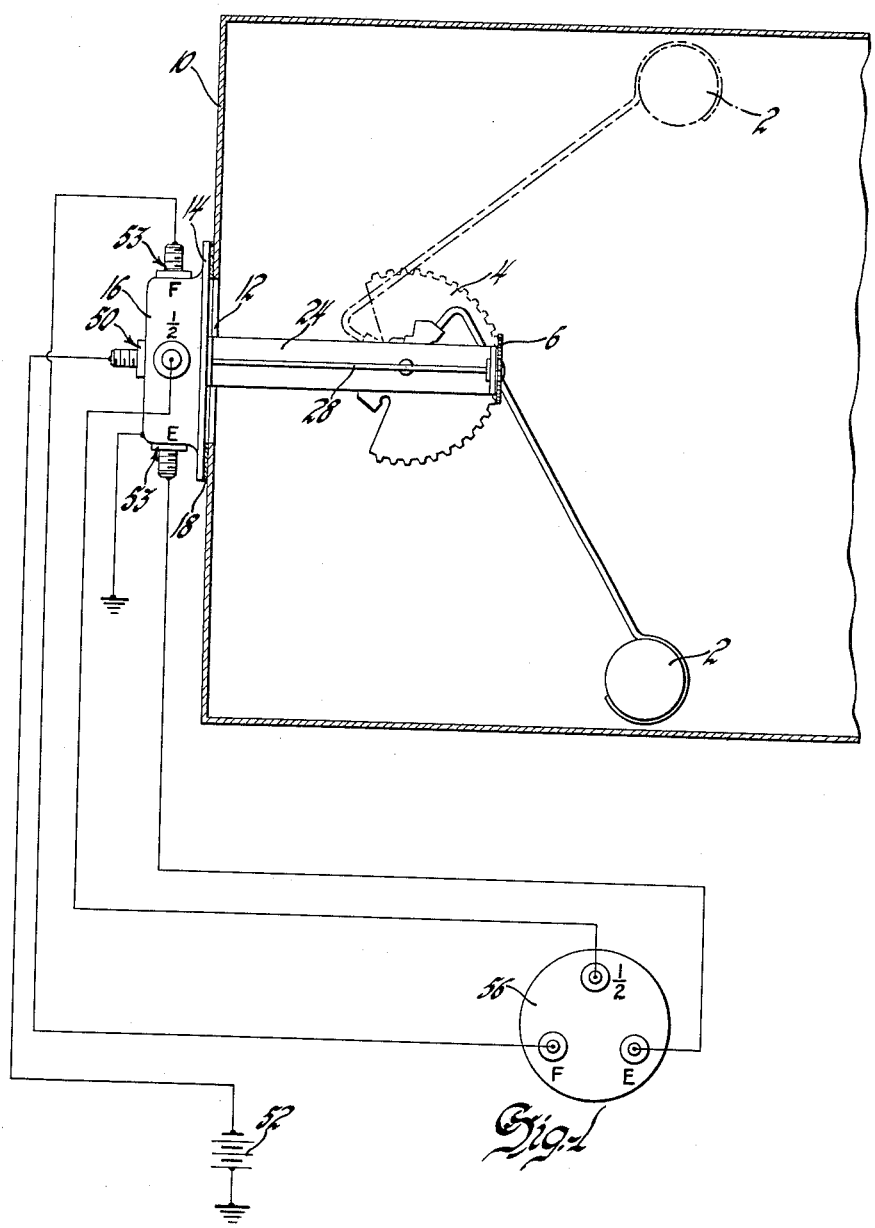
Figure 1 is a vertical section through one end of a fuel tank with a sending unit of the present invention installed thereon, the electrical circuits employed being shown diagrammatically.

In Figure 1 the fuel tank 10 is shown as being provided with an opening 12 around which the flange 14 of a cup 16 is attached with a gasket 18 interposed.

It will be appreciated that in automotive use it is customary to employ a float 2 connected to a gear segment 4 which in turn is adapted to rotate a pinion gear 6 affixed to a shaft. Movement of the float in response to variations in liquid level thereby serves to rotate the shaft to impart a signal to a sending unit located on the tank.

In Figure 3 it is seen that the sending unit comprises a base plate 20 around the periphery of which the flange 14 is made to conform. A gasket 22 is interposed between flange 14 and the plate 20 to prevent leakage. The base plate 20 serves as a support for a bracket 24 which is part of a float operated mechanism such as is commonly employed to determine liquid levels in automobile gasoline tanks. The plate 20 also serves to provide a bearing 26 for a shaft 28 which is adapted to be rotated in the customary manner by the float mechanism. In response to variations of liquid level in the tank 10 a dielectric disc member 30 is fixed to the end of the shaft 28 and is adapted to rotate therewith. The member 30 is lightened by holes 31. An annular recess 32 is provided on the member 30 concentric with the shaft 28 and an annular resistance element 34 is supported in the recess 32 with an edge thereof exposed to the left and within the cup 16 as viewed in Figure 3.

One side of the resistance element 34 is held by means of a clip 36 within the recess 32 and this clip is held to the dielectric member 30 by means of a rivet 38. The clip 36 also extends radially and the inner end thereof circumvents the end of the shaft 28 and is interposed between a head 40 on that shaft and the hub of the dielectric member 30.

Current is grounded from the shaft 28 by means of a washer 48 thereon and a coil spring 44 which presses against the washer, surrounds the shaft 28, and has one end fixed beneath one head of a rivet 46 which passes through the base plate 20.

In the center of the cup 16 and insulated therefrom is an electrical lead 50 with a metallic or spring contactor 51 leading therefrom to a portion of the element 34 diametrically opposite the clip 36. The lead 50 is adapted to be connected to a battery 52 (Figure 1).

Around the annular wall structure and equally spaced thereabout on the cup 16 are three leads 53 which are also insulated from the cup in a customary manner but each of these leads is provided with a sliding contact 54 which is arranged resiliently to press against the exposed edge or margin of the resistance element 34. The contacts 54 press resiliently against the side or margin of the element 34 in directions substantially parallel with the shaft 28 or in directions inclined to the plane of one side of the element 34. The contact leads 53 are adapted to be connected by three lines to the indicator instrument diagrammatically illustrated as 56 in Figure 1.

The circuits employed to operate the indicator instrument are not fully described as such circuits and instruments do not form a part of the present invention. A signal imparted to the sending unit by rotation of the shaft 28 is transmitted to the receiver, indicator or gauge 56 on the car dash. This transmittal is customarily due, as in the present instance, to a rotational movement of an element in the sending unit being electrically imparted in corresponding extent to an indicating pointer or element in the receiver. Such circuits and equivalent instruments (insofar as the present invention is concerned) are fully described in various articles such as an article entitled "Analysis and design of D.-C. Selsyn system," by Mr. Joseph Manildi of the California Institute of Technology, printed from manuscripts made available on March 21, 1945, by the American Institute of Electrical Engineers at 33 West 39th Street, New York, N. Y. Another teaching is found in an article entitled "A D.-C. telemeter or D.-C. Selsyn for aircraft," by R. G. Jewell and H. T. Faus in the June 1942 issue of "Electrical Engineering," published by the American Institute of Electrical Engineers.

It will be noted from the above description of the construction that the sending units may be easily and inexpensively manufactured as the resistance elements may be made in strip form, cut to proper lengths and installed without the necessity of picking out leads from the coils. It should also be noted that the friction between the sliding contacts 54 and the resistance element 34 may be at a minimum without loss in reliability as any lack of concentricity between the shaft 28 and the resistance element 34 is of no moment.

Having described my invention, what I claim as new and desire to secure by Letters Patent of the United States is:

1. In a tank unit of an electric liquid level telemetric system, a cup which is peripherally adapted to fit around an opening in a tank, a bearing fixed to said cup, a conductive shaft protruding from said cup with one end journaled in said bearing, a float connected to said shaft and arranged to rotate the same, a dielectric member fixed to said shaft to rotate therewith, an annular resistance element supported by said member within said cup for rotation with said member and shaft, conductor means fixed to one side of said element and connected to ground through said shaft, a second conductor means leading into the said cup and forming a fixed electrical connection with the other side of said element, multiple contact leads passing through the wall structure of said cup having sliding and spaced contacts with said element, and said multiple leads being adapted to be connected to an indicator.

2. In a tank unit for use with an electric liquid level telemetric system, a cup, a bearing fixed to said cup, a shaft journaled in said cup, a float mechanism arranged to rotate said shaft, an annular resistance element within said cup and fixed to rotate with said shaft, means arranged to ground one side of said element, means leading through said cup and forming an electrical connection with the side of said element diametrically across from said one side, multiple contacts with leads passing into said cup and said contacts slidably connecting with said element at spaced locations, and said multiple contacts being adapted to be connected to an indicating instrument.

3. In a tank unit for use in an electric liquid level telemetric system, a cup having flanges adapted to fit around an opening in a tank, a shaft journaled for rotation and with one end extending into said cup, a float mechanism connected to said shaft and arranged to rotate the same, a dielectric member fixed to said shaft to rotate therewith, an annular resistance element substantially concentric with said shaft and supported by said member within said cup for rotation with said member and shaft, means for grounding one side of said element, means forming an electrical connection with the diametrically opposite side of said element, multiple contacts with leads extending through the wall structure of said cup and said contacts acting resiliently in directions inclined with the plane of one side of said element and against said element, and said multiple contact leads being adapted to be connected to an indicator.

4. A circular cup, a float operated shaft extending into said cup, axially of the latter, an annular resistance element within said cup and fixed to rotate with said shaft and concentrically thereof, means for passing a current into one side and away from the diametrically opposite side of said element, multiple leads passing into said cup, with contacts slidably engaged with said element in directions inclined with the plane of one side of said element, and said multiple leads being adapted to be connected to an indicator.

5. A cup, a rotatable shaft wtih one end extending into said cup, a float mechanism adapted to rotate said shaft, a dielectric disc attached to said shaft to rotate therewith, said disc having a recess concentric with said shaft, an annular resistance element supported in said recess, means for passing an electric current in predetermined paths through said element, multiple contacts acting resiliently against one side of said element in directions substantially parallel with said shaft, and said multiple contacts having leads adapted to be connected to an indicator.

6. In a tank unit for use with an electric liquid level telemetric system, a cup having a flanged periphery adapted to fit around an opening in a tank, a base plate attached to and conforming with said flanged periphery and presenting a bearing for a float operated shaft extending into said cup, a dielectric disc fixed to rotate with said shaft and located within said cup, an annular resistance element supported in a recess formed in said disc concentric with said shaft, conductor means leading into said cup and fixed to one side of said element, another conductor means leading from a different portion of said element and connected to ground through said shaft, multiple leads passing through the wall structure of said cup and having sliding and spaced contacts with said element, said contacts acting resiliently in directions substantially parallel with said shaft and said multiple contact leads being adapted to be connected to an indicating instrument of said system.

7. A cup, a shaft journaled with respect to said cup with one end projecting therein, a circular assembly including an annular resistance element concentrically fixed to said end for rotation therewith, four leads passing through the wall structure of said cup, connections from one lead being arranged to pass current through predetermined paths of said element to ground, and connections from the other three leads having spaced frictional contacts with said element.

References Cited in the file of this patent

UNITED STATES PATENTS

| | | |
|---|---|---|
| 1,616,529 | Dittlinger et al. | Feb. 8, 1927 |
| 1,676,255 | Dittlinger et al. | July 10, 1928 |